Patented Oct. 13, 1953

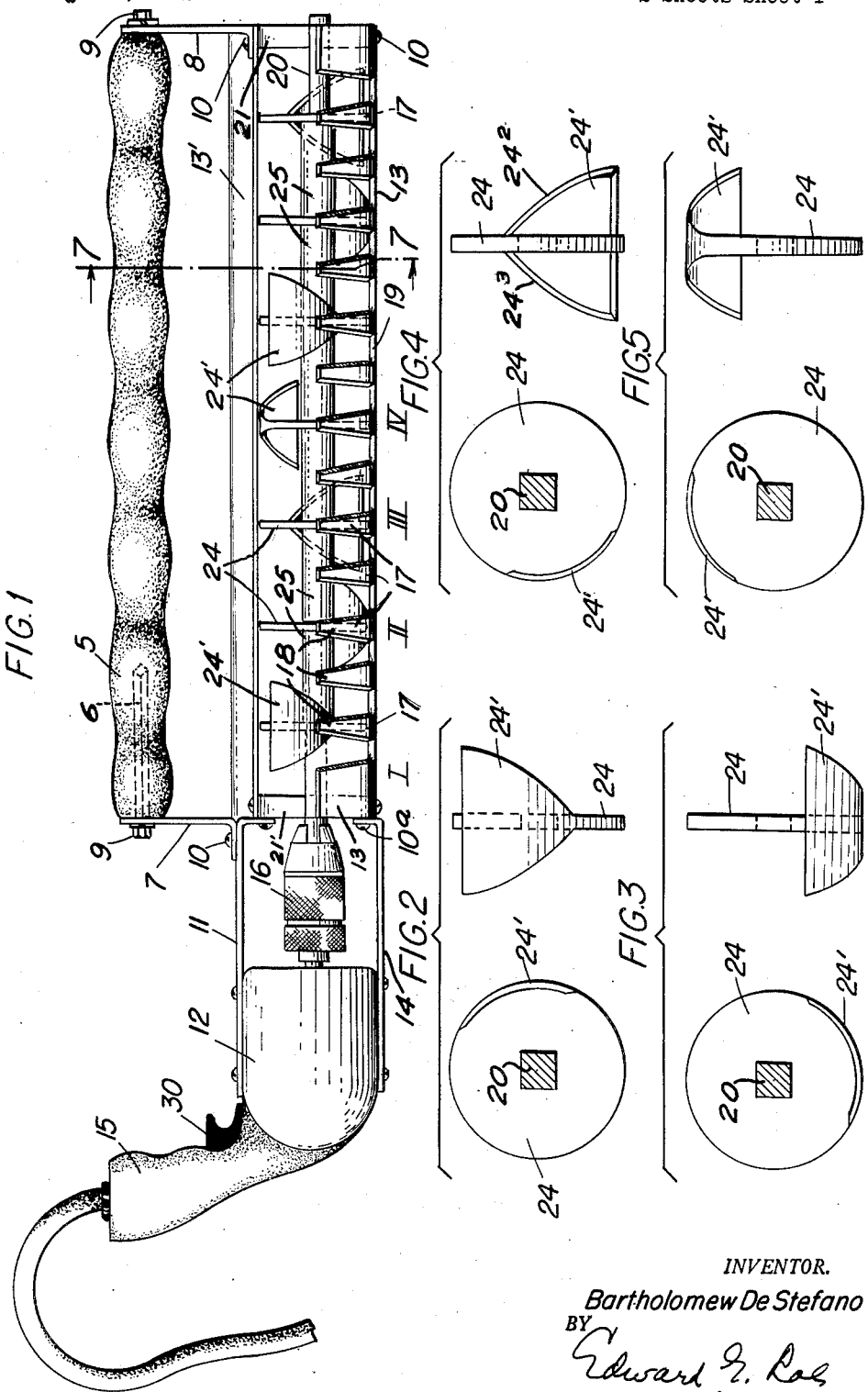

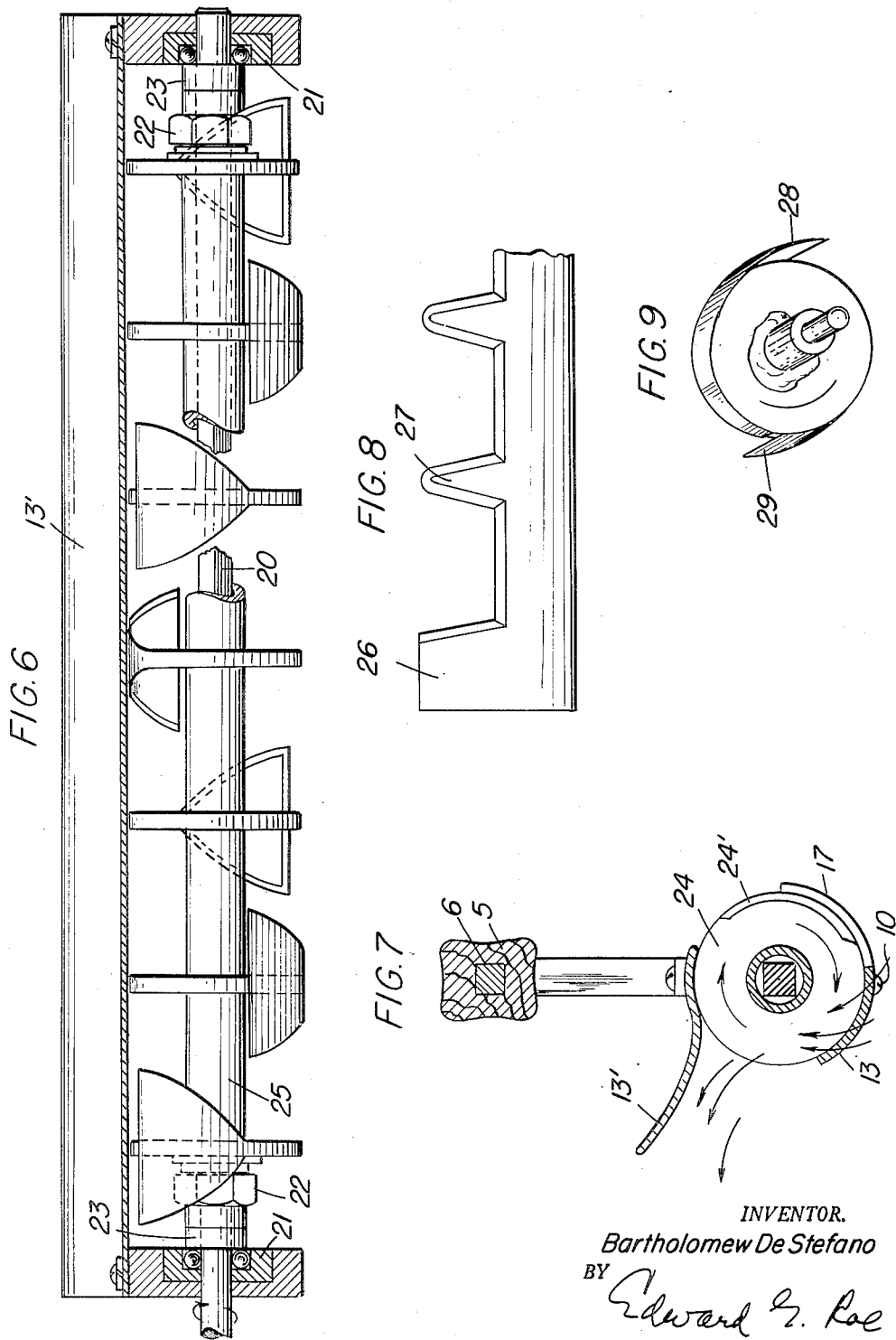

2,654,947

UNITED STATES PATENT OFFICE 2,654,947

HEDGE CLIPPER

Bartholomew De Stefano, City Island, N. Y.

Application August 27, 1952, Serial No. 306,557

3 Claims. (Cl. 30—206)

In a generic sense the invention relates to a hedge clipper designed for cutting materials, such as foliage on hedges, grass, grains or the like. The clippers heretofore employed have been subject to certain inherent disadvantages. First, they are expensive. Secondly, they are difficult to manipulate and cut the hedge evenly, due to vibration and the weight of the machines. In the third place, the cutting mechanisms have not been efficient to the point that all of the hedge or material required to be clipped is cut the first "run through." Then there is the problem of sharpening which involves sharpening all of the cutting elements at one time and there are other disadvantages known to the home owner.

My hedge clipper overcomes all of the disadvantages of the conventional cutting machines and has for its objects, comprehends and accomplishes a cutting device characterized by:

1. Maximum, positive cutting effectiveness.
2. Maximum field of adjustment made instantaneously.
3. A single or a plurality of cutting elements can be sharpened as desired.
4. Simplicity of assembly and disassembly.
5. Lightness of weight.
6. Ease of manipulation.
7. Economy of manufacture.

These and other accomplishments will be manifest after a perusal of the specifications, drawings and claims.

Hereinafter the reference to "hedge" as one material to be cut is illustrative only and not limitative. Furthermore, other material than hedge foliage, grass, grains or the like can be cut, for example—twigs.

Briefly described my hedge clipper includes a frame, handles, a rotatable shaft carrying a plurality of cutting wheels, bearings for the shaft, a cooperating, elongated, channelled and fixed housing plate provided with rake teeth, which, as the cutting wheels rotate conjunctively, positively cuts the hedge foliage or other material.

In one preferred embodiment—the cutting wheels, in which the essence of the invention resides, are peripherally disposed, are quasi-wedge or V-shaped, are formed on the periphery of the wheels, the latter being mounted in parallelism on the shaft with each successive cutting wheel positioned offset 90° from the next cutting wheel on the shaft. Stated otherwise, the cutting wheels are positioned in staggered relation to one another. The invention comprehends the provision of a high speed source of power, such as the conventional hand drill motor, as well as a shield to protect the hand and to throw the cuttings away from the device as they are cut, and other refinements.

In the drawings:

Fig. 1 is a front elevation view of the cutting device.

Fig. 2 depicts the cutting wheel shown in position 1.

Fig. 3 is the cutting wheel shown in position 2.

Fig. 4 is the cutting wheel in position 3.

Fig. 5 illustrates the cutting wheel as shown in position 4.

Fig. 6 is an enlarged view of the cutting wheels arranged in their four positions according to the square shaft on which they are mounted.

Fig. 7 is a cross section of Fig. 1 along lines 7—7 showing the protective shield.

Fig. 8 is a modification of the housing plate shown in Fig. 1.

Fig. 9 is a modification of the cutting wheel showing the wheel brazed to the shaft.

For purposes of explication, the numbered parts comprising the invention are initially and listed below:

5—Handle.
6—Rod inserted through the handle.
7—Rear bracket.
8—Front bracket.
9—Nuts for affixing handle to brackets.
10—Fasteners.
10'—Fastener.
11—Bracket.
12—Motor.
13—Housing plate.
$13_1$—Housing shield guard plate.
14—Bracket.
15—Handle.
16—Chuck.
17—Rake teeth.
18—Cutting edges of teeth.
19—Valleys.
20—Rotating shaft.
21—Front bearing.
21'—Rear bearing.
22—Adjusting nuts.
23—Spacing collars.
24—Cutting wheels.
$24_1$—Cutters on wheels 24.
25—Spacing sleeves.
26—Modified housing plate.
27—Modified teeth.
28—Peripheral flanges on modified wheel.
29—Peripheral flanges on modified wheel.
30—Switch button on motor.

With reference to the drawings and the above catalogue of parts, the hedge clipper includes a handle 5, having square rod 6 extending therethrough, to prevent the handle from turning when the hedge clipper is manipulated. Rod 6 is threaded at opposite ends to which outer ends of a rear bracket 7 and a front bracket 8 are attached as by nuts 9. As illustrated in Fig. 1 fasteners 10 are utilized to fix the inner or lower end of the bracket 7 to the front end of the bracket 11 which is affixed to and extends forwardly from the motor 12 and to secure the inner or lower end of the bracket 8 to the front end of the housing shield guard plate 13₁, respectively.

Bracket 14 connects one side of motor 12 to the rear end of the housing plate 13 to which it is secured by a fastener 10'. The source of power 12 is preferably, but not necessarily, a motor comparable to that of a conventional hand drill, having a handle 15 which serves as an auxiliary handle for the hedge clipper. A chuck 16 extends forwardly from the motor. A relative high R. P. M. is desirable.

Housing plate 13 is provided with a plurality of rake teeth 17, each tooth having, by way of example, cutting edges 18 along its opposite sides and its outer or upper end, with the bottoms of valleys 19 between the teeth also serving as cooperating cutting elements. Housing shield guard plate 13₁ which is spaced from the housing plate 13 and its teeth 17 is flared outwardly and upward, as shown in Fig. 7 to protect a person's hands and deflect cut material away from the handle 5.

A rotatable shaft 20 is journalled in front and rear bearings 21 and inwardly of said bearings the shaft is threaded to mate the threads of adjusting nuts 22, while spacing sleeves 23 may be mounted on the shaft between the bearings and the nuts. The inner end of shaft 20 is elongated and projects from the rear bearing 21' a distance enabling it to be gripped by chuck 16 of motor 12. As illustrated in Fig. 1, slots may be formed in brackets 11 and 14, permitting horizontal adjustment of the motor longitudinally of the brackets toward or away from shaft 20.

The major portion of the shaft 20 between bearings 21 and 21', however, is square in cross section—see Figs. 2, 3, 4, 5, and carries a plurality of cutting wheels 24 in parallelism, the centers of the wheels being formed to embrace to a nicety the shaft 20 and be rotated therewith as motor 12 rotates the shaft. This construction also facilitates disassembly and re-positioning and arrangement of the wheels.

Cutting wheels 24, the essence of the invention, have formed on a portion of their periphery novel plates or cutters 24₁; in the preferred embodiment shown in Figs. 1, 2, 3, 4, 5, 6, and 7 these elements assume a form which may be described as quasi wedge, V-triangular or shield shaped, with their path of travel, as the shaft is rotated, being in a plane about the axis of the shaft in concentric relation thereto. One part of each cutter or blade 24₁ comprises a peripheral extension on one side of the wheel, while the other counterpart extends from the other side of the wheel. The blades 24₁ have substantially two cutting edges 24 and 43 along opposite side edges which are preferably bevel sharpened as indicated in Fig. 4. The outer surface of cutters 24₁ orthographically, is a circular cylindrical surface, as cutting wheels 24 are substantially circular, are concentric, and I have found that one preferred dimension of blades 24₁ is that the horizontal cutting edge 24₂ and 24₃ of cutters 24₁ should each cover the interstices between two of the teeth 17 for maximum efficiency. Additionally, I have determined that the wheels should be mounted with cutters 24₁ sequentially offset 90° one from the other. For example, Fig. 2 depicts one cutting wheel positioned as is the wheel indicated by Roman numeral I in Fig. 1. Fig. 3 indicates the position of the wheel in Fig. 1 denoted by Roman numeral II; Fig. 4 is the position of the wheel indicated by Roman numeral III of Fig. 1—while Fig. 5 illustrates the wheel in the position indicated by Roman numeral IV of Fig. 1. This sequence is continued regardless of the number of cutting wheels mounted on the shaft—as the seven wheels shown in Fig. 1 is not to be construed as limitative in any sense. This arrangement keeps the shaft in balance as the shaft rotates at a high rate of speed. Between wheels 24 I provide spacing sleeves 25, enabling facile disassembly of the hedge clipper and sharpening of any one or all of the cutting blades, as well as expediting assembly.

As indicated by arrows in Figs. 6 and 7, the shaft rotates cutting wheels 24 in a clockwise direction—when the device is moved toward the material to be cut—see Fig. 7—material enters in the interstices between the teeth 27 and is positively sheared off by the conjunctive shearing action of cutters 24₁, and cutting edges 18 of teeth 17, with the apices and edges of the inverted quasi-triangular shaped cutters 24₁, raking against side edges 18 of the teeth and valleys 19 to positively cut the material. Instantaneous adjustment to cut heavier or lighter material is accomplished by manipulation of handles 5 and 15 to present more or less of the raking teeth toward the work.

A modified housing plate 26 is shown in Fig. 8, with larger interstices provided between the teeth 27, and this modification illustrates that the housing plate may be interchanged with plates having more or less space between the teeth for different types of material to be worked on.

Additionally, the cutting wheels may be modified to assume the form depicted in Fig. 9, the fin-like peripheral flanges 28, 29 disposed oppositely to one another on this modification, and as shown in Fig. 9, the cutting wheels may be brazed or welded to the shaft.

The cutting device is susceptible to various refinements—such as providing motor 12 with button switch 30 adapted to be moved to off or on position with the thumb of the hand gripping handle 15.

I reserve the right to make such changes or modifications as may come within the scope of the appended claims.

I claim:

1. A hand operated foliage clipper comprising an elongated handle having front and rear ends, a frame under said handle extending longitudinally thereof and supported at front and rear ends from ends of the handle, bearings at front and rear ends of the frame, a shaft extending longitudinally of said frame between and rotatably mounted through said bearings and at its rear end projecting from the rear bearing, a motor mounted in rearwardly spaced relation to the rear end of said frame and constituting an auxiliary handle for the clipper, a chuck extending forwardly from said motor towards the rear end of the frame and gripping the rear end of said bearings and turning with said shaft and spaced from each other longitudinally of and circumferentially of the shaft, blades carried by said wheels, said blades extending circumferentially of the wheels and each having a straight end edge projecting equal distances from opposite sides of a wheel and sharpened side edges converging toward the periphery of the wheel, and fingers carried by said frame and extending circumferentially of the wheels in cooperating relation to said blades and having sharpened side edges along which the sharpened side edges of the blades move during rotation of the shaft and the wheels.

2. A hand operated foliage clipper comprising a frame having upper and lower longitudinally extending plates having side edges which are spaced from each other to provide an entrance along one side of the frame and an outlet along the other side thereof, bearings between front and rear ends of said plates holding the plates spaced vertically from each other, brackets extending upwardly at front and rear ends of the upper plate, a handle extending longitudinally of said frame above the upper plate and secured between said brackets, a rotary shaft extending longitudinally of said frame between said plates and having front and rear ends mounted through said bearings, the rear end portion of said shaft protruding from the rear bearing, upper and lower brackets extending rearwardly from the rear end of said frame, an electric motor mounted between the last mentioned brackets and having an upwardly projecting handle, a chuck carried by and extending forwardly from said motor and gripping the rear end of said shaft, cutting members carried by said shaft and turning therewith, and cutting members carried by the lower plate and extending outwardly and upwardly therefrom in cooperating relation to the cutters carried by said shaft.

3. A hand operated foliage clipper comprising a frame having upper and lower longitudinally extending plates having front and rear ends, side edges of said plates being spaced from each other and providing an entrance along one side of the frame and an outlet along the other side of the frame, bearings between front and rear ends of said plates holding the plates spaced from each other, brackets extending upwardly at front and rear ends of the upper plate, a handle extending longitudinally of said frame above the upper plate and secured between said brackets, a rotary shaft extending longitudinally of said frame between said plates and having front and rear ends mounted through said bearings with the rear end of the shaft protruding from the rear bearing, upper and lower brackets extending rearwardly of said frame from ends of the upper and lower plates, an electric motor mounted horizontally between the last mentioned brackets and having an upwardly projecting handle constituting an auxiliary handle for the clipper, and carrying a switch for the motor, a chuck extending forwardly from said motor toward the rear bearing and gripping the rear end of said shaft, cutting wheels about said shaft turning therewith and spaced from each other longitudinally of the shaft, said plates being both arcuate transversely and disposed close to peripheries of the wheels, the upper plate having a portion extending laterally from the wheels at an upward curvature along the upper edge of the outlet and constituting a deflector for clipped foliage discharged from the frame between the upper and lower plates, blades carried by said wheels, and fingers carried by one plate and having shearing engagement with the blades during rotation of the shaft and said wheels.

BARTHOLOMEW DE STEFANO.

References Cited in the file of this patent

UNITED STATES PATENTS

| Number | Name | Date |
|---|---|---|
| 371,288 | Walker | Oct. 11, 1887 |
| 1,370,352 | Parmley | Mar. 1, 1921 |
| 1,450,011 | Wagner | Mar. 27, 1923 |
| 1,899,439 | Gratiot | Feb. 28, 1933 |
| 2,509,343 | Henderson | May 30, 1950 |
| 2,539,794 | Ream | Jan. 30, 1951 |
| 2,619,786 | Ream | Dec. 2, 1952 |

FOREIGN PATENTS

| Number | Country | Date |
|---|---|---|
| 257,419 | Great Britain | Sept. 2, 1926 |